(12) United States Patent
Wu

(10) Patent No.: US 9,103,420 B2
(45) Date of Patent: Aug. 11, 2015

(54) LINEAR ACTUATOR WITH ARM DRIVEN MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 444 days.

(21) Appl. No.: 13/752,225

(22) Filed: Jan. 28, 2013

(65) Prior Publication Data

US 2014/0174225 A1 Jun. 26, 2014

(30) Foreign Application Priority Data

Dec. 24, 2012 (TW) .............................. 101224973 U

(51) Int. Cl.
*F16H 25/20* (2006.01)

(52) U.S. Cl.
CPC ............ *F16H 25/20* (2013.01); *F16H 25/2015* (2013.01); *F16H 2025/209* (2013.01); *F16H 2025/2065* (2013.01); *F16H 2025/2071* (2013.01); *F16H 2025/2084* (2013.01); *Y10T 74/18576* (2015.01); *Y10T 74/18704* (2015.01)

(58) Field of Classification Search
CPC ................ F16H 2025/2065; F16H 2025/2071; F16H 2025/2084; F16H 2025/209
See application file for complete search history.

(56) References Cited

U.S. PATENT DOCUMENTS

| 2,541,529 A * | 2/1951 | McVicker ....................... 74/625 |
| 2006/0243075 A1* | 11/2006 | Liou et al. .................... 74/89.39 |
| 2010/0001125 A1* | 1/2010 | Cavalier et al. .............. 244/99.3 |

* cited by examiner

*Primary Examiner* — William Kelleher
*Assistant Examiner* — Terence Boes
(74) *Attorney, Agent, or Firm* — Chun-Ming Shih; HDLS IPR Services

(57) ABSTRACT

A linear actuator (1) includes an electrical driving mechanism (10), a lead screw (20), an outer tube (30), a telescopic tube (40) and an arm driven mechanism (50). The arm driven mechanism (50) comprises an arm (51), a driving nut (52), a telescopic sleeve (53), a first washer (54), a nut-tube (55) and a second washer (56). The arm (51) is provided with a handle (511) and a sleeve (512), and the sleeve (512) links with the lead screw (20). An outer peripheral of the telescopic sleeve (53) provided with a plural of screws for screwing with the telescopic tube (40). The nut-tube (55) links with the driving nut (52) for moving together. When the handle (511) rotates, the linear actuator (1) can be operated.

13 Claims, 7 Drawing Sheets

LINEAR ACTUATOR WITH ARM DRIVEN MECHANISM

This application is based on and claims priority from Taiwan Application No. 101224973, filed Dec. 24, 2012, the disclosure of which is hereby incorporated by reference herein in its entirety.

BACKGROUND OF THE INVENTION

1. Field of the Invention

The present invention generally relates to linear actuators and, in particular to a linear actuator device with arm driven mechanism.

2. Description of Related Art

A linear actuator is an indispensable component of automation equipments. Its application scope is quite widespread and includes beds, chairs, tables, lifting platforms, electric windows and so on.

A common linear actuator comprises mostly a frame base assembled with a motor and an outer tube, where a lead screw driven by an electric motor is installed in the frame base. Moreover, a telescopic tube is screwed on the outer of the lead screw, an outer tube is sleeved on the outer of the telescopic tube and one end thereof is fixed on the frame base. Therefore, the telescopic tube can perform linear reciprocating displacement relative to the outer tube along an axis of the lead screw by the driving of the electric motor.

Because currently lead screws of linear actuators are driven by electricity, they cannot work dispensing with power supply or in the conditions of power failure. Thus how to make linear actuators operating and dispensing with power supply or in the conditions of power failure for emergency situations is a subject of the inventor to solve In view of the above drawbacks, the Inventor proposes the present invention based on his expert knowledge and elaborate researches in order to solve the problems of related art.

SUMMARY OF THE INVENTION

Accordingly, an object of the present invention is to provide a linear actuator with arm driven mechanism that the linear actuator can be operated under the situation dispensing with power supply.

In order to achieve the object mentioned above, the present invention provides a linear actuator with arm driven mechanism. The linear actuator has a lead screw and a telescopic tube. The arm driven mechanism comprises an arm, a driving nut, a telescopic, a first washer, a nut-tube and a second washer. The arm is provided with a handle and a sleeve connecting with the handle, and the sleeve links with the lead screw. The driving nut screws with the lead screw for transmission.

The telescopic sleeve sleeves on an outer of the driving nut, and an outer peripheral of the telescopic sleeve provided with a plural of screws for screwing with the telescopic tube. The first washer is sandwiched between the driving nut and the telescopic sleeve. The nut-tube is inserted between the driving and the telescopic sleeve linking with the driving nut. The second washer is sandwiched between the telescopic sleeve and the nut-tube. Wherein, when the lead screw rotates, the driving nut and the nut-tube linearly moves together with telescopic sleeve through the first washer and the second washer; when the driving nut or the nut-tube is blocked and stopped, the driving nut and the nut-tube rotates with relative to the lead screw, and the telescopic sleeve slips between the first washer and the second washer to make the telescopic sleeve idling with respect to the driving nut and the nut-tube.

In order to achieve the object mentioned above, the present invention provides a linear actuator comprises an electrical driving mechanism, a lead screw, an outer tube, a telescopic tube and an arm driven mechanism. The electrical driving mechanism includes a frame base and an electric motor capable of producing forward and reversible motion force fixed on the frame base. The lead screw rotates and being driven by the electric motor. The outer tube is sleeved on the outer of the lead screw and fixed on an end of the frame base. And the telescopic tube is inserted in the outer tube making telescopic movement relative to the outer tube.

The arm driven mechanism comprises an arm, a driving nut, a telescopic, a first washer, a nut-tube and a second washer. The arm is provided with a handle and a sleeve connecting with the handle, and the sleeve links with the lead screw. The driving nut screws with the lead screw for transmission. The telescopic sleeve sleeves on an outer of the driving nut, and an outer peripheral of the telescopic sleeve provided with a plural of screws for screwing with the telescopic tube. The first washer is sandwiched between the driving nut and the telescopic sleeve. The nut-tube is inserted between the driving and the telescopic sleeve linking with the driving nut. The second washer is sandwiched between the telescopic sleeve and the nut-tube. Wherein, when the lead screw rotates, the driving nut and the nut-tube linearly moves together with telescopic sleeve through the first washer and the second washer; when the driving nut or the nut-tube is blocked and stopped, the driving nut and the nut-tube rotates with relative to the lead screw, and the telescopic sleeve slips between the first washer and the second washer to make the telescopic sleeve idling with respect to the driving nut and the nut-tube.

Comparing to the related art, the linear actuator of the present invention has an arm driven mechanism. The arm driven mechanism connects the lead screw through the coupling for replacing the electric motor to drive the linear actuator operating in the conditions of power failure. Moreover, when the driving nut of the arm driven mechanism is blocked, the friction of the lead screw and the driving nut is larger than the friction of the first washer, the second washer and the nut-tube. Then the telescopic sleeve slips between the first washer and the second washer to make the telescopic sleeve idling with respect to the driving nut and the nut-tube. Thus the telescopic will depart from the driving of the lead screw, and the telescopic tube of the telescopic will stop moving. Thereby the linear actuator can be prevented from excessive displacement.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
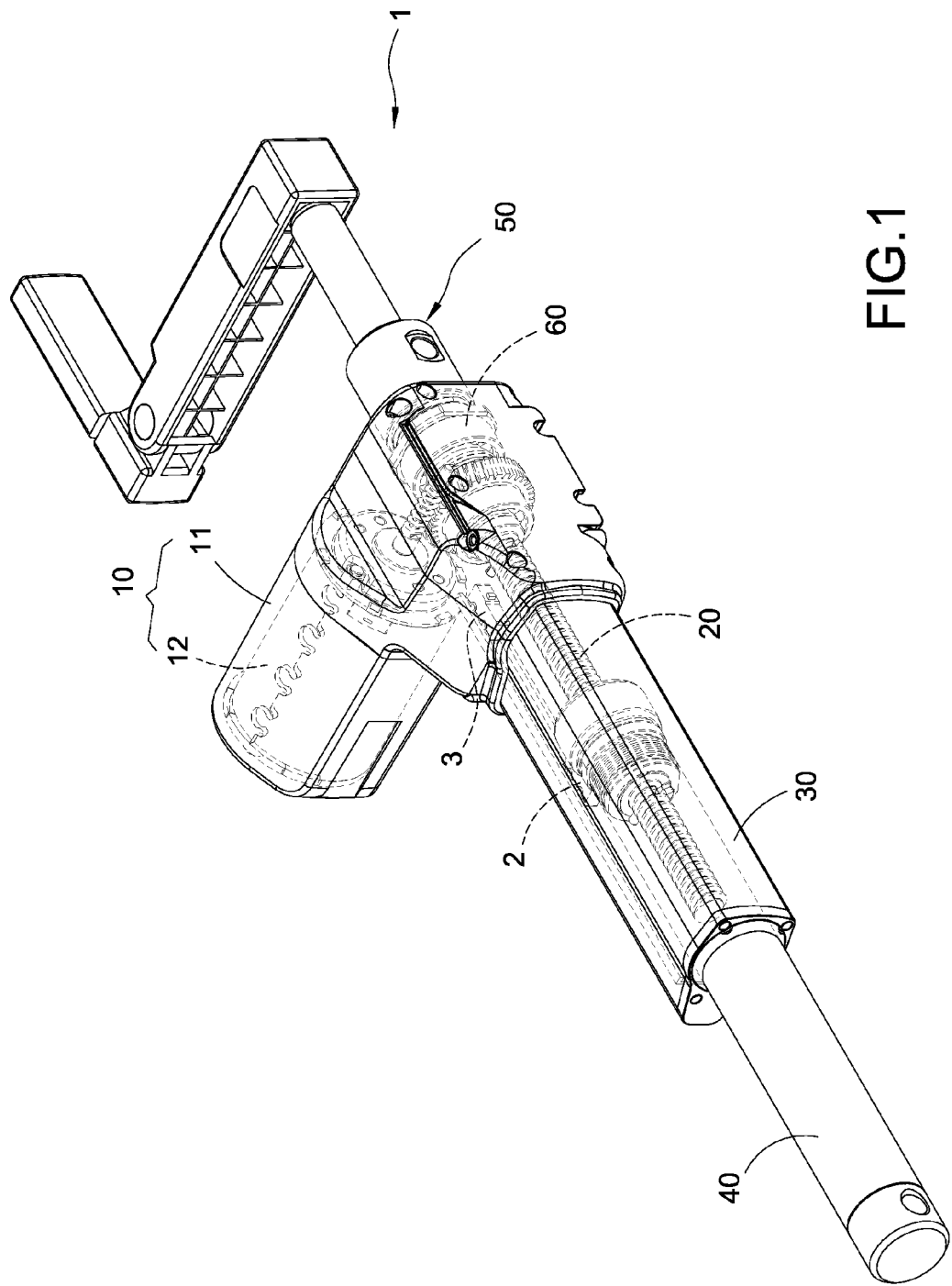
FIG. 1 is a perspective schematic view of a linear actuator with arm driven mechanism of the present invention.
Figure 2:
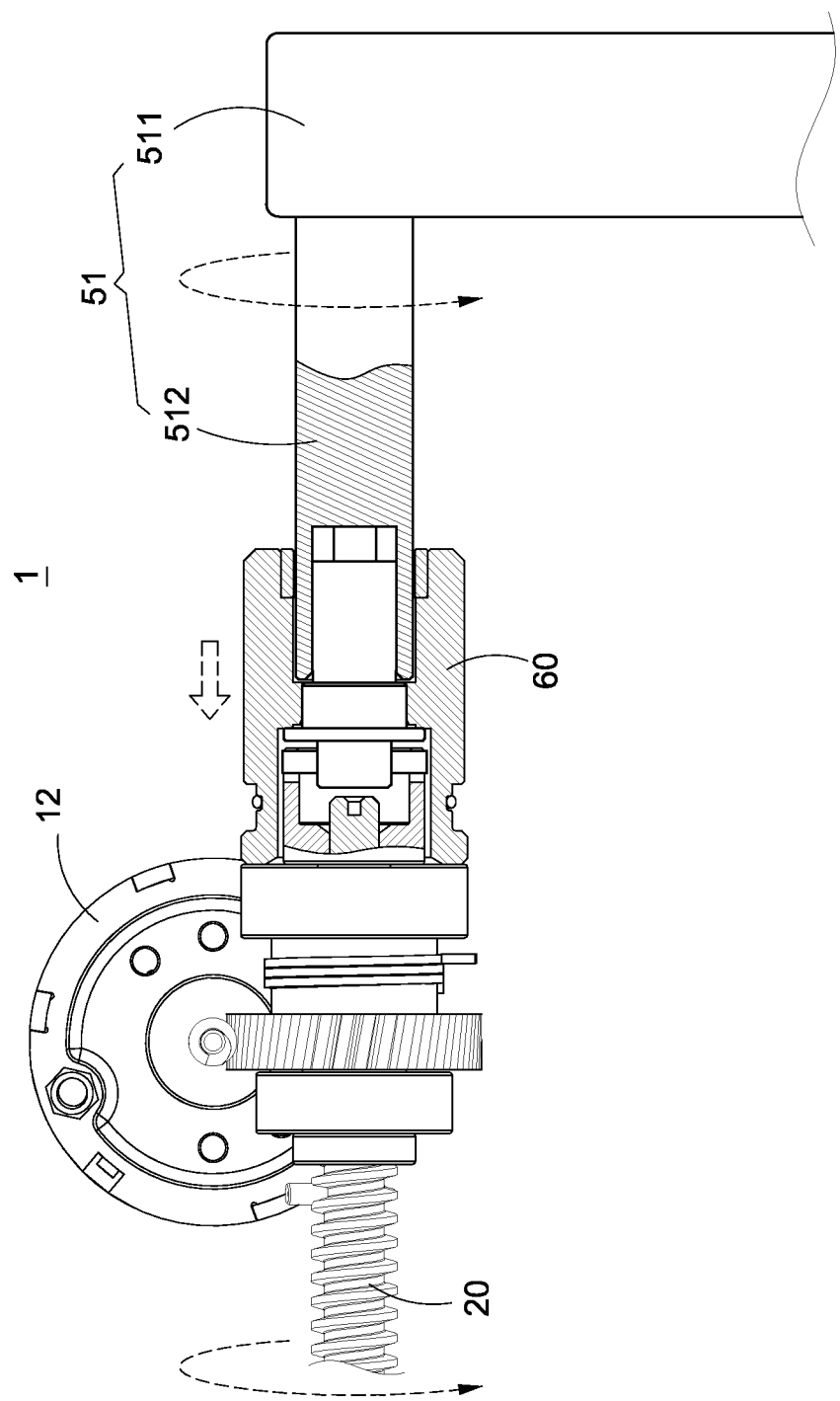
FIG. 2 is an assembly cross sectional view of the arm of the present invention.
Figure 3:
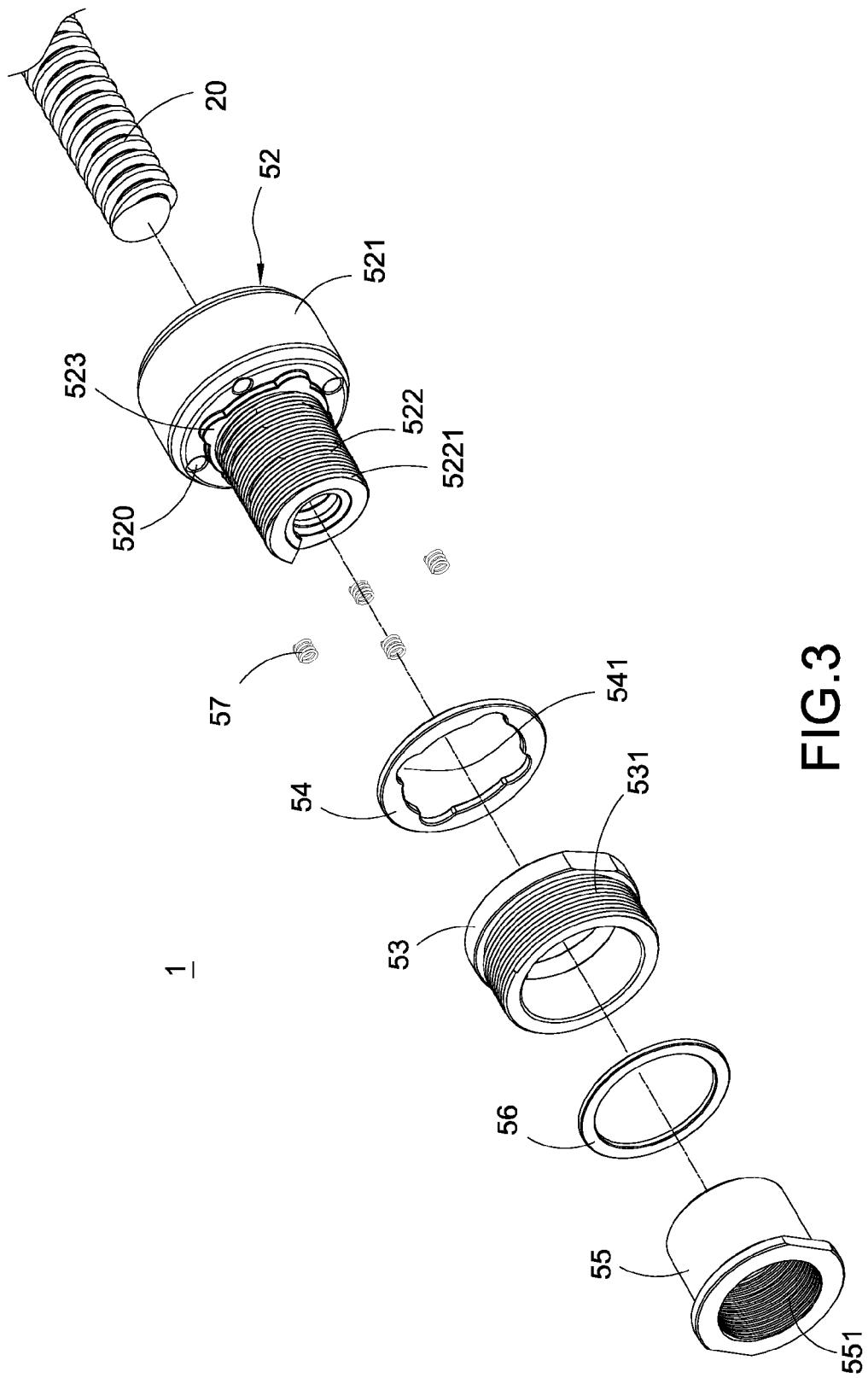
FIG. 3 is a perspective exploding view of the present invention.
Figure 4:
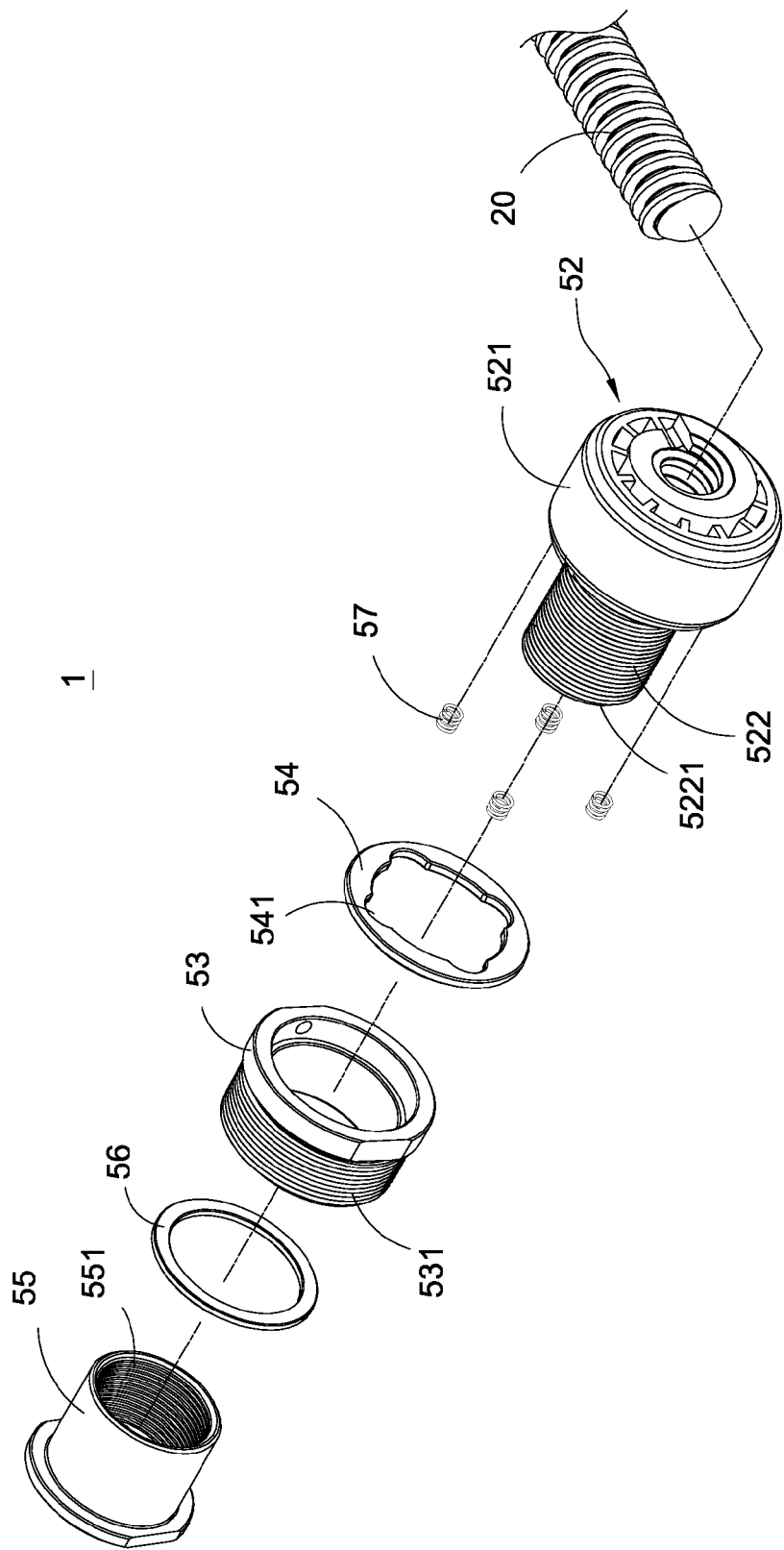
FIG. 4 is another perspective exploding view of the present invention.
Figure 5:
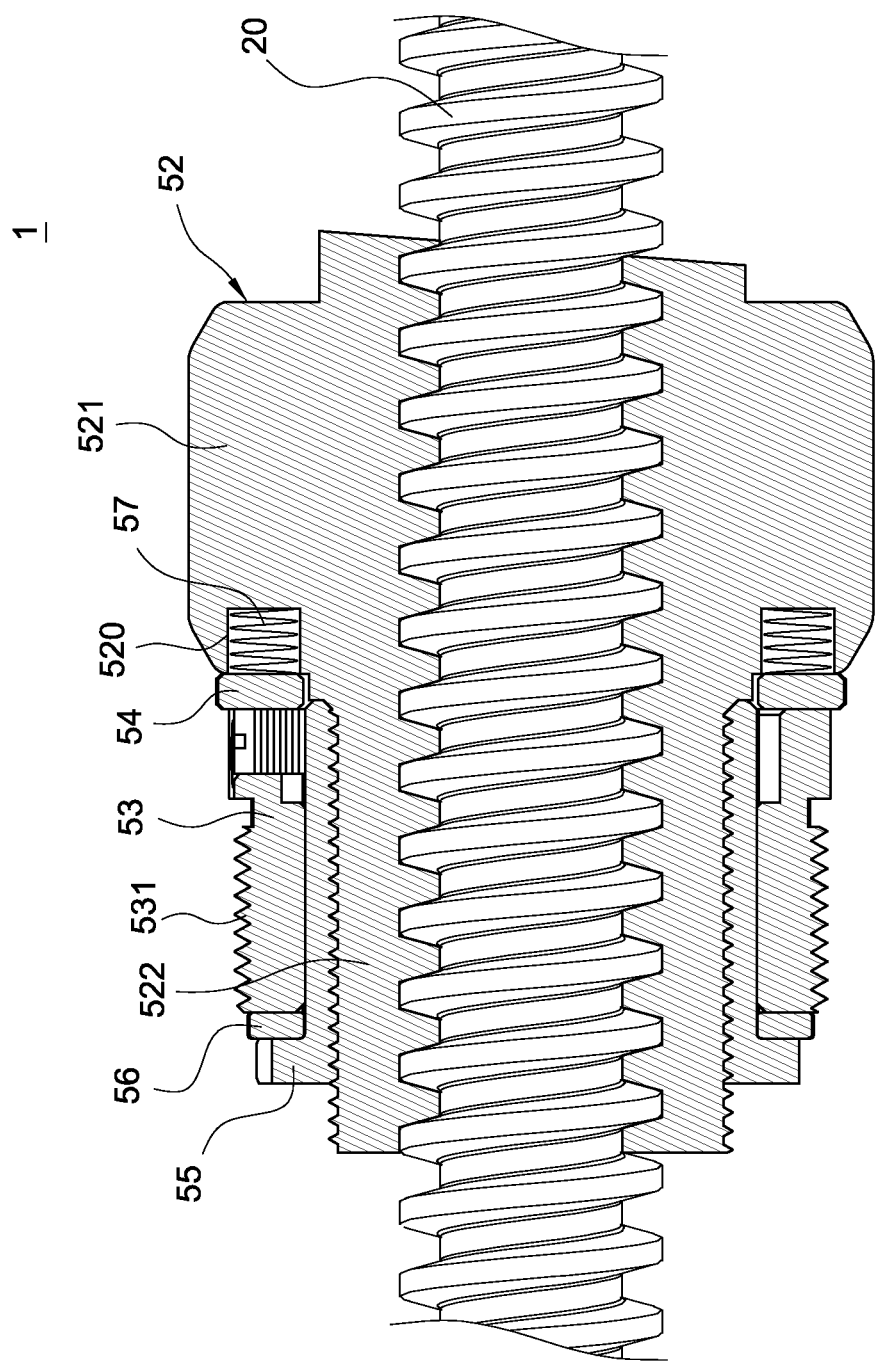
FIG. 5 is an assembly cross sectional view of the arm driven mechanism of the present invention.

Please refer to FIG. 1, it depicts a perspective schematic view of a linear actuator with arm driven mechanism of the present invention. The linear actuator 1 includes an electrical driving mechanism 10, a lead screw 20, an outer tube 30, a telescopic tube 40 and an arm driven mechanism 50. The electrical driving mechanism 10 brings the lead screw 20 rotating. The telescopic tube 40 moves back and forth through driving of the lead screw 20. Moreover, the arm driven mechanism 50 can drive the lead screw 20 rotating under the situation dispensing with power supply.

In the present embodiment, the lead screw 20 has a front block 21 and a rear block 22, the front block 21 and the rear block 22 are disposed in the front and back ends of the lead screw 20 respectively. The arm driven mechanism 50 will be blocked by the rear block 21 and stopped from moving backwards when the lead screw 20 rotates backward a distance. Thereby the linear actuator 1 can be prevented from excessive displacement.

Or the linear actuator 1 can dispose a front brake switch 2 and a rear brake switch 3 electrically connected with the electric motor 12. The front brake switch 2 and the rear brake switch 3 are disposed in the front and back ends inside the outer tube 30 respectively. When the lead screw 20 rotates backward a distance, the front brake switch 2 and the rear brake switch 3 will stop the electrical driving mechanism 10 from operating, and the lead screw 20 will stop rotating.

The electrical driving mechanism 10 includes a frame base 11 and an electric motor 12 fixed on the frame base 11 and capable of producing forward and reversible motion force. The rotating of the lead screw 20 is driven by the electric motor 12. The outer tube 20 is sleeved on the outer of the lead screw 20 and fixed on an end of the frame base 11. The telescopic tube 40 inserted in the outer tube 30 can make telescopic movement relative to the outer tube 30. The structure of the arm driven mechanism 50 will be described later.

Please refer to FIG. 2 to FIG. 5, they depict an assembly cross sectional view of the arm, two perspective exploding views and an assembly cross sectional view of the arm driven mechanism. The arm driven mechanism 50 includes an arm 51, a driving nut 52, a telescopic 53, a first washer 54, a nut-tube 55 and a second washer 56.

The arm 51 is provided with a handle 511 and a sleeve 512 connecting with the handle 511, and the sleeve 512 links with the lead screw 20. The arm driven mechanism 50 includes a coupling 60 connecting with the lead screw 20, and the arm 51 links the lead screw 20 through the coupling 60. In an embodiment of the present invention, the sleeve 512 of the arm 51 sleeves the coupling 60 with each other to move the arm 51 with the lead screw 20 together.

The driving nut 52 screws with the lead screw 20 for transmission. The telescopic sleeve 53 sleeves on the outer of the driving nut 52, and an outer peripheral of the telescopic sleeve 53 is provided with a plural of screws 531 for screwing with the telescopic tube 53.

Besides, the first washer 54 and the second washer 56 are wear-resisting plates. The first washer 54 is sandwiched between the driving nut 52 and the telescopic sleeve 53. The nut-tube 55 is inserted between the driving nut 52 and the telescopic sleeve 53 linking with the driving nut 52. The second washer 56 is sandwiched between the telescopic sleeve 53 and the nut-tube 55.

In an embodiment of the present invention, the driving nut 52 includes a head section 521 and a screw section 522 connecting with the head section 521. One side of the head section 521 has a plural of bumps 523 neighboring the screw section 522. The first washer 54 has a plural of embedding slots 541 correspondingly, and the first washer 54 engages with the bumps 523 through the embedding slots 541.

Furthermore, an outer surface of the screw section 522 has a plural of first screws 5221 and an inner surface of the nut-tube 55 has a plural of second screws 551 correspondingly. The nut-tube 55 screws on the screw section 522 through the second screws 551.

Preferably, the arm driven mechanism 50 further includes a plural of springs 57. The head section 521 is provided with a plural of accommodating slots 520 on a side toward the first washer 54, and the springs 57 disposed in the accommodating slots 520 are against the first washer 54.

Figure 6:
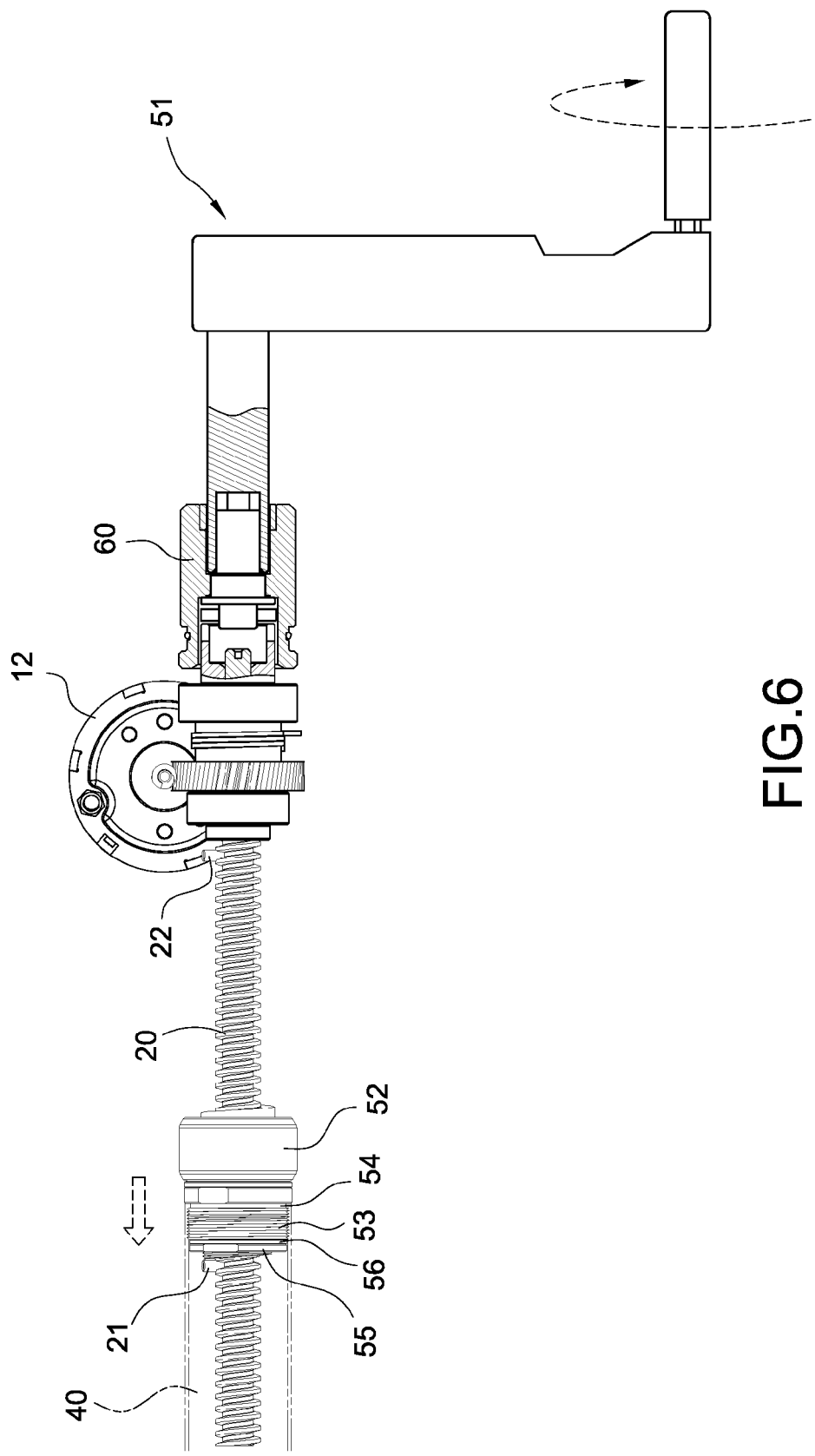
FIG. 6 is an operating state of a linear actuator with arm driven mechanism of the present invention.
Figure 7:
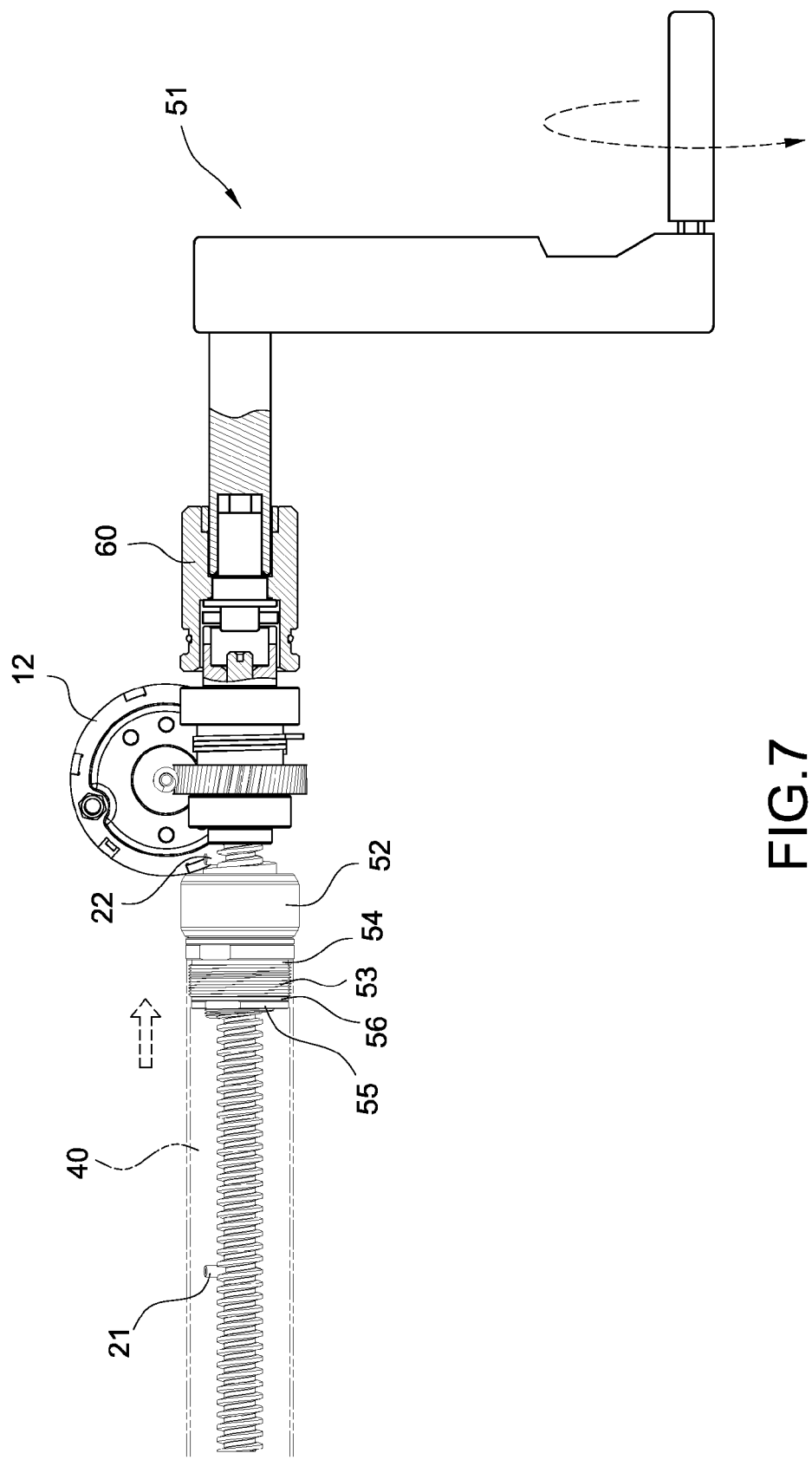
FIG. 7 is another operating state of a linear actuator with arm driven mechanism of the present invention.

Please refer to FIG. 6 and FIG. 7, they depict two operating state of a linear actuator with arm driven mechanism of the present invention. The lead screw 20 can be rotated by the arm rotating or the electric motor. As shown in FIG. 6, when the arm 51 rotates to one direction, the lead screw 20 will move forward axially. In this moment, the friction of the lead screw 20 and the driving nut 52 is smaller than the friction of the first washer 54, the second washer 56 and the nut-tube 55. The driving nut 52 and the nut-tube 55 will take the telescopic sleeve 53 moving forward linearly through the first washer 54 and the second washer 56, and the telescopic tube 40 of the telescopic sleeve 53 will stretch outwardly.

Next, when the driving nut 52 and the nut-sleeve moves to the position of the front block 21, the driving nut 52 or the nut-tube 55 will be blocked by the front block 21 and stopped from moving forward. In this moment, the friction of the lead screw 20 and the driving nut 52 is large than the friction of the first washer 54, the second washer 56 and the nut-tube 55. The driving nut 52 and the nut-tube 52 will rotate with respect to the lead screw 20. The telescopic sleeve 53 slips between the first washer 54 and the second washer 56 to make the telescopic sleeve 53 idling with respect to the driving nut 52 and the nut-tube 55. Thus the telescopic 53 will depart from the driving of the lead screw 20, and the telescopic tube 40 of the telescopic 53 will stop moving.

As shown in FIG. 7, when the arm 51 rotates to another direction, the lead screw 20 will move afterward axially. The driving nut 52 and the nut-tube 55 will take the telescopic sleeve 53 moving forward linearly through the clamping of the first washer 54 and the second washer 56, and the telescopic tube 40 of the telescopic sleeve 53 will retract inwardly.

Similarly, when the driving nut 52 moves to the position of the rear block 22, the driving nut 52 will be stopped from moving by the rear block 22. At the moment, the driving nut 52 and the nut-tube 55 will rotate with respect to the lead screw 20. The telescopic sleeve 53 will depart from the driving of the lead screw 20, and the telescopic tube 40 of the telescopic sleeve 53 will be stopped.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A linear actuator with arm driven mechanism (50), the linear actuator (1) having a lead screw (20) and a telescopic tube (40), the arm driven mechanism (50) comprising:
   an arm (51) provided with a handle (511) and a sleeve (512) connecting with the handle (511), the sleeve (512) linking with the lead screw (20);
   a driving nut (52) screwed with the lead screw (20) for transmission;
   a telescopic sleeve (53) sleeved on an outer of the driving nut (52), an outer peripheral of the telescopic sleeve (53) provided with a plurality of screws for screwing with the telescopic tube (40);
   a first washer (54) sandwiched between the driving nut (52) and the telescopic sleeve (53);
   a nut-tube (55) inserted between the driving nut (52) and the telescopic sleeve (53) linking with the driving nut (52); and
   a second washer (56) sandwiched between the telescopic sleeve (53) and the nut-tube (55);
   wherein when the lead screw (20) rotates, the driving nut (52) and the nut-tube (55) linearly moves together with telescopic sleeve (53) through the first washer (54) and the second washer (56); when the driving nut (52) or the nut-tube (55) is blocked and stopped, the driving nut (52) and the nut-tube (55) rotates relative to the lead screw (20), and the telescopic sleeve (53) slips between the first washer (54) and the second washer (56) to make the telescopic sleeve (53) idle with respect to the driving nut (52) and the nut-tube (55).

2. The mechanism according to claim 1, further including a coupling (60) connecting with the lead screw (20), the arm (51) links the lead screw (20) through the coupling (60).

3. The mechanism according to claim 2, wherein the sleeve (512) of the arm (51) sleeves the coupling (60) with each other to move the arm (51) with the lead screw (20) together.

4. The mechanism according to claim 1, wherein the driving nut (52) includes a head section (521) and a screw section (522) connecting with the head section (521), one side of the head section (521) has a plurality of bumps (523) neighboring the screw section (522) and the first washer (54) has a plurality of embedding slots (541) correspondingly, the first washer (54) engages with the bumps (523) through the embedding slots (541).

5. The mechanism according to claim 4, further including a plurality of springs (57), wherein the head section (521) is provided with a plurality of accommodating slots (520) on a side toward the first washer (54), the springs (57) disposed in the accommodating slots (520) are against the first washer (54).

6. The mechanism according to claim 4, wherein an outer surface of the screw section (522) has a plurality of first screws (5221) and an inner surface of the nut-tube (55) has a plurality of second screws (551) correspondingly, the nut-tube (55) screws on the screw section (522) through the second screws (551).

7. A linear actuator (1), comprising:
   an electrical driving mechanism (10) including a frame base (11) and an electric motor (12), the electric motor (12) producing forward and reversible motion force and fixed on the frame base (11);
   a lead screw (20) rotating driven by the electric motor (12);
   an outer tube (30) sleeved on the outer of the lead screw (20) and fixed on an end of the frame base (11);
   a telescopic tube (40) inserted in the outer tube (30) and making telescopic movement relative to the outer tube (30); and
   an arm driven mechanism (50) comprising an arm (51), a driving nut (52) screwed with the lead screw (20) for transmission, a telescopic (53) sleeve sleeved on an outside of the driving nut (52), a first washer (54) sandwiched between the driving nut (52) and the telescopic sleeve (40), a nut-tube (55) inserted between the driving nut (52) and the telescopic sleeve (53) and linking the driving nut (52) and a second washer (56) sandwiched between the telescopic sleeve (53) and the nut-tube (55), the arm (51) is provided with a handle (511) and a sleeve (512) connecting with the handle (511), the sleeve (512) linking with the lead screw (20), an outer periphery of the telescopic sleeve is provided with a plurality of screws for screwing with the telescopic tube (20), the nut-tube (55) linking with driving nut (52); wherein, when the lead screw (20) rotates, the driving nut (52) and the nut-tube (55) linearly moves together with telescopic sleeve (53) through the first washer (54) and the second washer (56); when the driving nut (52) or the nut-tube (55) is blocked and stopped, the driving nut (52) and the nut-tube (55) rotates relative to the lead screw (20), and the telescopic sleeve (53) slips between the first washer (54) and the second washer (56) to make the telescopic sleeve (53) idle with respect to the driving nut (52) and the nut-tube (55).

8. The linear actuator according to claim 7, wherein the arm driven mechanism (50) further including a coupling (60) connecting with the lead screw (20), the arm (51) links the lead screw (20) through the coupling (60).

9. The linear actuator according to claim 7, wherein the lead screw (20) has a front block (21) and a rear block (22), the front block (21) and the rear block (22) are disposed in the front and back ends of the lead screw (20) respectively.

10. The linear actuator according to claim 7, further including a front brake switch (2) and a rear brake switch (3), the front brake switch (2) and the rear brake switch (3) are disposed in the front and back ends inside the outer tube (30) respectively.

11. The linear actuator according to claim 7, wherein the driving nut (52) includes a head section (521) and a screw section (522) connecting with the head section (521), one side of the head section (521) has a plurality of bumps (523) neighboring the screw section (522) and the first washer (54) has a plurality of embedding slots (541) correspondingly, the first washer (54) engages with the bumps (523) through the embedding slots (541).

12. The linear actuator according to claim 11, wherein the arm driven mechanism (50) further including a plurality of springs (57), wherein the head section (521) is provided with a plurality of accommodating slots (520) on a side toward the first washer (54), the springs (57) disposed in the accommodating slots (520) are against the first washer (54).

13. The linear actuator according to claim 11, wherein an outer surface of the screw section (522) has a plurality of first screws (5221) and an inner surface of the nut-tube (55) has a plurality of second screws (551) correspondingly, the nut-tube (55) screws on the screw section (522) through the second screws (551).

\* \* \* \* \*